United States Patent [19]

De Forest et al.

[11] Patent Number: 4,502,075

[45] Date of Patent: Feb. 26, 1985

[54] METHOD AND APPARATUS FOR PRODUCING OPTICAL DISPLAYS

[75] Inventors: Sherman E. De Forest, Encinitas; Gunner Bolz, Solano Beach; Robert E. La Quey, La Jolla, all of Calif.

[73] Assignee: International Remote Imaging Systems, Chatsworth, Calif.

[21] Appl. No.: 327,367

[22] Filed: Dec. 4, 1981

[51] Int. Cl.³ .............................................. H04N 7/18
[52] U.S. Cl. ..................... 358/93; 358/101; 358/105; 358/107
[58] Field of Search ............... 358/93, 105, 256, 284, 358/166, 231, 101, 107, 106, 96, 226, 237; 353/28, 30, 34, 35

[56] References Cited

U.S. PATENT DOCUMENTS

| | | | |
|---|---|---|---|
| 3,054,998 | 9/1962 | Cooper et al. | 343/5 |
| 3,585,288 | 6/1971 | Benjamin | 178/7.85 |
| 3,617,625 | 11/1971 | Redpath | 178/6.5 |
| 3,916,439 | 10/1975 | Lloyd et al. | 358/81 |
| 3,928,842 | 12/1975 | Green et al. | 340/146.3 Q |
| 3,961,366 | 6/1976 | Weishaupt | 358/256 |
| 4,153,913 | 5/1979 | Swift | 358/93 |
| 4,262,306 | 4/1981 | Remmer | 358/106 |

OTHER PUBLICATIONS

J. Cederquist and S. H. Lee, "The Use of Feedback in Optical Information Processing", Applied Physics, vol. 18, pp. 311-319 (1979).
A. W. Lohmann, "Suggestions for Hybrid Image Processing", Optics Communications, vol. 22, No. 2, p. 165 (Aug. 1977).
G. Hausler & A. Lohmann, "Hybrid Image Processing with Feedback", Optica Communications, vol. 21, No. 3, p. 365 (Jun., 1977).
G. Hausler & M. Simon, "Generation of Space and Time Picture Oscillations by Active Incoherent Feedback", Optica Acta, Vol. 25, No. 4, pp. 327-336 (1978).
T. Sato, K. Sasaki and R. Yamamoto, "Image Processing System Using Incoherent Image Feedback", Applied Optics, Vol. 17, No. 5, p. 717 (Mar. 1978).

*Primary Examiner*—John C. Martin
*Assistant Examiner*—Edward L. Coles
*Attorney, Agent, or Firm*—Limbach, Limbach & Sutton

[57] ABSTRACT

Method and apparatus are disclosed for creating optical displays from a real optical scene with an optical feedback circuit projecting a parameter of the original scene for combination with the original scene itself or an image thereof. The feedback circuit may influence the parametric image in many ways to influence the combined optical display. For instance, the parametric image may be a negative of the real scene to produce a null combined display showing motion where the parametric image is time delayed or the parametric image may be defocused to produce a combined display with edge enhancement. The feedback circuit may project a vertical parametric image to create fixed relation combined displays or the feedback circuit can project real parametric images continuously to create a combined display which changes progressively as a function of the relation between original and parametric images. The method and apparatus may be used for a variety of purposes such as motion detection in security devices or live sperm counting or real image enhancement in biological microscopy.

14 Claims, 3 Drawing Figures

METHOD AND APPARATUS FOR PRODUCING OPTICAL DISPLAYS

DESCRIPTION

1. Technical Field

This invention relates to optical displays and image enhancement.

2. Background of the Invention

Dramatic improvements have been made in recent years in the field of image enhancement. Most of these improvements have been made in the aerospace industry where, for instance, an image improved picture is made from a satellite picture where the image improved picture is vastly clearer than the original satellite picture to the extent that it seems to contain information absent from the original. These image enhancement techniques are performed as electronic manipulations of signals which represent the picture rather than by manipulation of real optical scenes themselves.

In accordance with this invention image enhancement is performed with all of the versatility of the known electronic digital image enhancement techniques, but employing manipulation of the real optical scenes so that characteristics of the original scene participate throughout the image enhancement process and in the final composite optical display.

While some devices in the past, such as document verification devices, have employed techniques where an image is projected onto a mask or pattern, like a negative, which is a parameter of some predetermined valid document, none of those devices, like this invention, projected together an image and a parameter of itself. Thus, these prior devices have used projection to compare a real optical scene to a standard, but they have not produced the unique results which are produced with this invention by the interaction of a real optical scene and its parametric image.

SUMMARY OF THE INVENTION

This invention relates to optical systems and more particularly to arrangements of optical systems including feedback circuits in which a parameter of a real scene is projected onto the live scene or an image of the live scene.

In its simplest sense the invention can be viewed as taking a picture of a real scene and projecting the picture back on the scene itself. The result is generally emphasis of all information content of the scene increasing contrasts and color intensities.

In more complex forms of the invention, the picture of the real scene is subjected to change to produce a picture which is a parameter of the real scene and the parametric image is projected back on the original scene or on the image. The simple form of the invention is really just a limiting case of these complex forms where the parametric relationship between the original scene and parametric image is a one to one relationship.

A variety of changes may be employed in forming the parametric image from the original scene and these different parametric relationships produce many useful results in the composite optical display when the parametric image is recombined with the original scene or with an image of the original. For instance, the parametric image may be a negative or time delayed or subject to spatial modulation or color modulation.

Where the parametric image is a negative of the original scene, the combined optical display will have reduced contrast from the real scene with the contrast reduction extending all of the way to a null picture (uniform gray) depending upon the relative intensities of the illumination in the original scene and the projection of the parametric image and the absorption and reflectivity of materials where recombination takes place. Many situations exist where the composite display of this type with reduced contrast produces useful results. For instance, in many industrial inspection situations where microcircuitry and the like are inspected, these composite displays can increase the visibility of dull features which are normally obscured because of their proximity to bright features, and features which differentially absorb light of a particular wavelength can be distinguished from each other.

The use of a negative parametric image is particularly advantageous when combined with time delay. Thus, where the parametric image is a negative image of a real scene projected back on the real scene after a time delay, the composite display is a reduced contrast, more or less null image, in which any moving article is emphasized. In the ultimate case of a pure null image only moving components are visible and all stationary components in the real scene are invisible. Component displays of this type are useful in watching an article undergo a processing change during manufacture.

Many desirable results can be produced in the composite display where the parametric image is produced with spatial modulation such as defocusing. Thus, a defocused parametric image combines with the real subject to obscure generalities and emphasize major transitions in the original subject. This can be viewed generally as tending to convert a half-tone picture into an outline or line drawing picture. This technique is important where it is desirable to produce a composite display which emphasizes the outlines of objects. Consider, for instance, the problems in microscopy where different shaped cells are to be examined. A defocused image is projected onto the cell sample in a microscopic field of view producing emphasis of the edges of the cells in the focal plane of the microscope. Note that the parametric defocused image might also be a partial negative image to increase illumination in the peripheral areas of view where normal illumination of the microscope field is weak.

Some of the most powerful benefits of the invention are obtained when projection of the parametric image and the real scene together is performed continuously with real images. Thus, some of the techniques mentioned above may be used on a finite basis where recombination of the parametric image and real scene ends there. This is the case where the parametric image is a virtual image or where the combined optical display is not further photographed, parametrically modified and recombined. In other situations unique advantages are obtained where the parametric image is a real image and the composite display is a real combination which is further and continuously photographed, parametrically modified and recombined. This technique can be performed most conveniently with optical equipment such as television cameras, digital processors and television projectors which can parametrically modify and recombine real images continuously in real time.

The powerful results of these continuous systems may be appreciated from these examples. Where a semen sample is examined under a microscope by a television camera, the output of which is converted into a negative image time delayed slightly and reprojected by a television projector onto the sample, a technician examining the sample to perform a count of live spermatozoa will see only the live spermatozoa with dead spermatozoa and stationary debris washed out of the image.

Similarly, a negative time delayed image of a security area combined with the original image and displayed on a monitor will instantly call a guard's attention to intrusion into the security area.

Where the real optical scene is a transparent tube or passageway with a clear fluid containing particulate matter flowing through it, the real scene combined with a negative time delayed image will show a picture of the particles which were in motion. Note that the fluid medium was in motion too, but it does not appear in the composite image because the fluid is uniform so that different parts of it appear to be the same optically. Careful adjustment of the time delay in the parametric image can produce very useful results. For instance, slower moving particles near the edges of the stream may be weaker optical components in the combined display while faster moving particles in the center of the stream will be brighter components. Such a composite display carries important flow information, and if a constant time delay is used corresponding to overage flow rate, the composite display gives a live picture of flow for uses like wind tunnels.

In the example given above for combining a defocused parametric image of cells with the original, the addition of continuous sweeping of the focal plane of the microscope and continuous parametric modification and reprojection can permit the technician to see the cell surface in topological projection.

Continuous parametric modification of and recombination with the composite display has particular advantages and produces surprising results where the real optical scene contains components with non-uniform reflectivity at different colors, and these results may be enhanced by detection of the composite display and reprojection of the parametric image through different color filters.

A variety of additional applications of this method will be apparent considering the variety of modifications which can be employed singly and in combination in preparing the parametric image. These changes include changes in color, time, size, intensity and all of the other manipulations which have developed in the field of image enhancement. Additionally, the method of this invention can be practiced with a variety of forms of apparatus.

The preferred apparatus of the invention for practice of the method of the invention uses the television camera, processor and projector mentioned above, and there are a number of ways that these can be arranged for particular desired results.

DETAILED DESCRIPTION OF THE DRAWINGS

Figure 1:
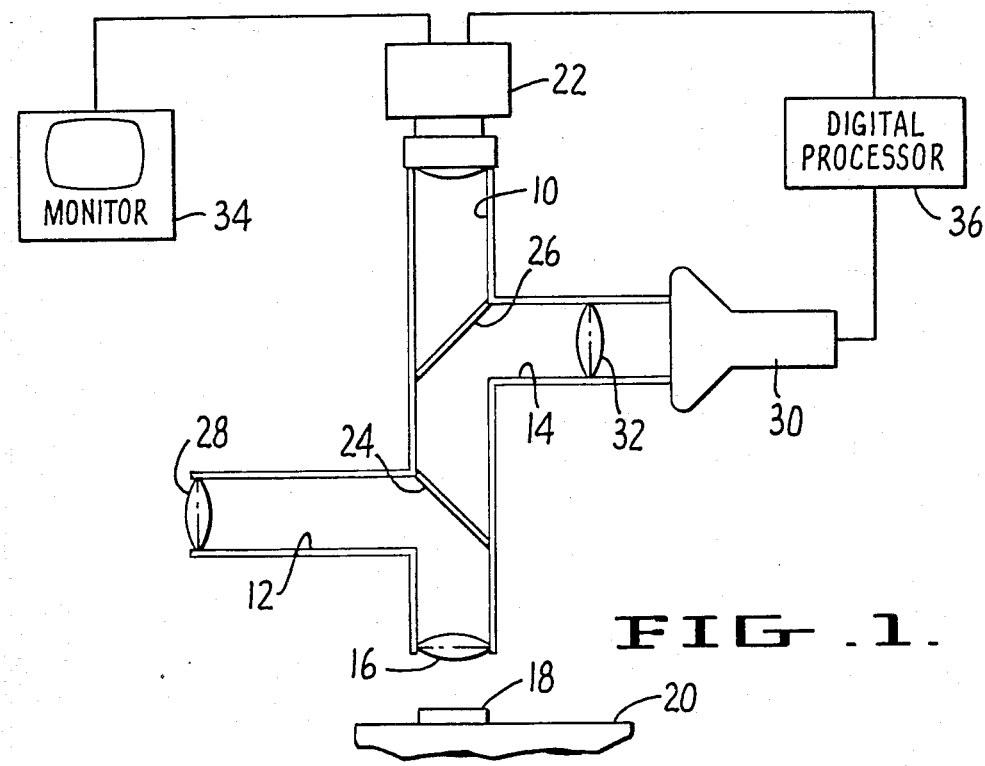
FIG. 1 is a schematic view of one form of the apparatus of this invention which is adapted for direct microscopic viewing of an optical display produced in accordance with the method and apparatus of this invention.

Referring now in detail to the drawings and particularly to FIG. 1, the system illustrated therein consists of an optical block containing a main bore 10 with branch bores 12 and 14. The main bore supports a magnifying lens 16 which is adapted to be focused on a specimen 18 supported at a stage 20. As indicated above the stage 20 may be a flat support zone or in the alternative may be a conduit through which the specimen 18 moves.

Positioned at the opposite end of the bore 10 from the magnifying lens 16 is a television camera which is preferably a charge coupled device, for instance, RCA CCD camera TC 1160. Mounted in the main bore 10 opposite the branch bores 12 and 14 are beam splitters 24 and 26, respectively, which may be conventional products such as National Photocolor Corporation Beam Splitting Pellicle standard dicroic coating (ST-SQ-DC). The beam splitter 24 permits direct viewing of the specimen 18 through eye piece 28, and the beam splitter 26 permits transmission of the image of specimen 18 to CCD camera 22 while at the same time reflecting a parametric image from a projection cathode-ray tube 30 through projection lens 32 back onto the specimen 18.

A television monitor 34 is connected to the camera 22 to permit monitoring of the camera output, and a digital processor 36, such as an Intel Multibus 8080 is connected between the CCD camera 22 and projecting CRT 30 for manipulating the camera output to produce at the CRT a parametric image of the specimen 18.

This apparatus thus provides a closed circuit optical system for production of optical displays in accordance with the method described above. The closed circuit system includes the support stage 20 where the specimen is viewed, the recording stage at camera 22 where an optical representation of the specimen is converted into an electronic signal output, the parametric processing stage at digital processor 36 where the electronic output is converted into a parameter of the camera output, the projection stage 30 where the processor output is projected as an optical parametric image of the original specimen 18 back onto the specimen 18 where the combined optical display of the original specimen with its superimposed parametric image is continuously viewed by the camera 22, further parametrically modified by the processor 36 and reprojected by the CRT 30.

As indicated above, the parametric processing stage consists of a suitable digital processor which may be programmed in conventional manner to first convert the output of CCD camera 22 into a digital representation of the camera picture with an analog to digital converter and then perform any of the parametric manipulations described above on the digital picture and finally reconvert the digital picture to an analog signal for the projection CRT 30.

In place of the digital processor 36 a variety of simple circuits may be employed. For instance, the output of camera 22 may be passed through simple circuits which invert the intensity component of the picture signal and pass that signal through a delay line to provide the negative delayed parametric image described above. While the simpler circuits may be employed, the digital processor is preferred for its flexibility in adapting the system to a variety of the parametric images described above.

Figure 2:
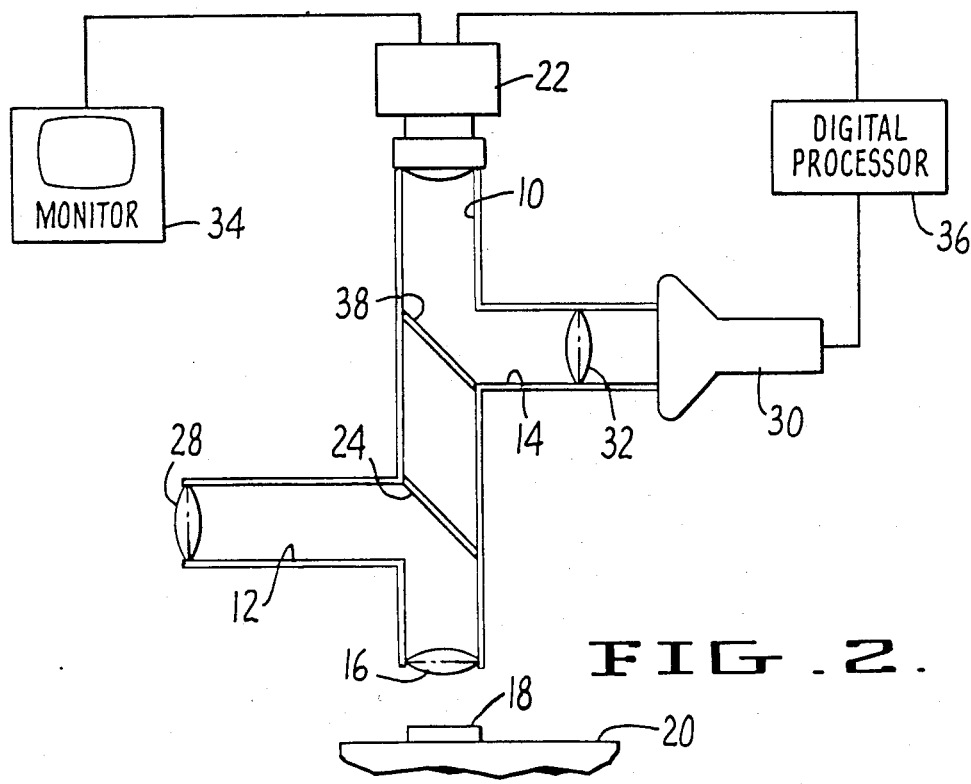
FIG. 2 is a schematic view of an alternative form of the apparatus of the invention in which the parametric image is recombined with the real optical scene at the camera stage of the feedback circuit instead of on the real subject itself so that the real subject can still be viewed unaltered.

The apparatus of FIG. 2 is similar to the apparatus of FIG. 1 except that the beam splitter 26 of FIG. 1 is replaced by the beam splitter 38 of FIG. 2. This change changes the closed loop path for reprojection of the parametric image so that the parametric image from CRT 30 is recombined with the real image of the specimen 18 at the input of the CCD camera 22. As a result a technician employing the instrument may simultaneous view the unaltered specimen through eye piece 28 and the combined optical display on monitor 34. Additionally, where desired, an additional eye piece and beam splitter can be employed betwen the beam splitter 38 and the camera 22 to permit real viewing of the combined optical display.

Figure 3:
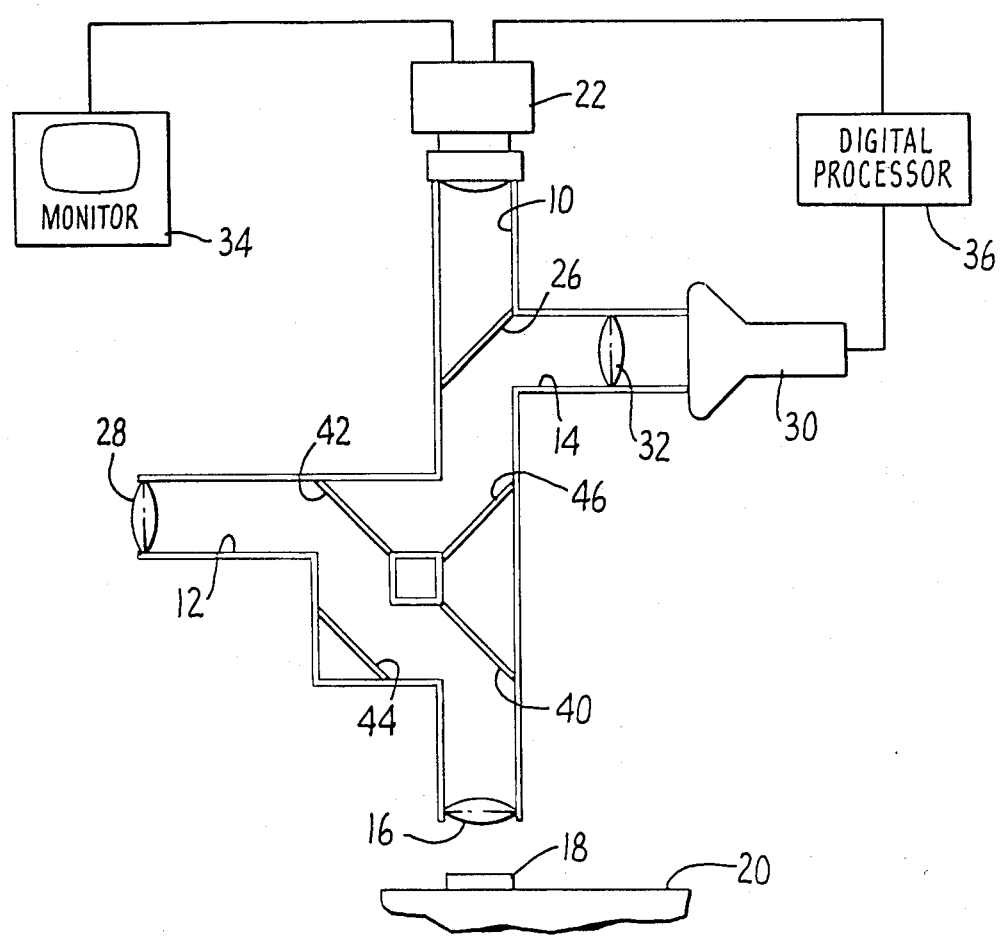
FIG. 3 is a schematic view of another alternative form of the apparatus of the invention in which the parametric image is recombined with an image of the original scene so that the original scene remains unaltered and the parametric modification is finite instead of progressive. Viewed from the eye of the observer he sees a virtual image of the parametric image superimposed on an image of the real scene.

In the apparatus of FIG. 3, the beam splitter 24 of FIG. 1 has been replaced by a pair of beam splitters 40 and 42 and a mirror 44 which deflect an image of the specimen 18 to the eye piece 28, and a beam splitter 46 directs the parametric image from CRT 30 and beam splitter 26 to eye piece 28 where images of the specimen and parametric image are viewed as the combined optical display. Note that here the image transmission path for the parametric image is not "closed" so that the parametric image is continuously recombined with an image of the specimen, but the parametric modification of the optical display is not progressive since the camera does not see the parametric image.

What is claimed is:

1. A method of creating an optical display which comprises:
   producing a representation of a real optical scene;
   establishing an image transmission path with the path including a stage at which the representation is produced; and
   projecting a parameter of the representation onto the real optical scene, whereby a combined optical display is produced comprising the real optical scene combined with a parameter of the representation of the real scene.

2. The method of claim 1 in which the parameter of the representation is a negative of the representation.

3. The method of claim 1 in which the parameter of the representation is a defocused image of the representation.

4. The method of claim 1 in which the parameter of the representation is a delayed image of the representation.

5. The method of claim 1 in which the parameter of the representation is a delayed negative image of the representation.

6. The method of claim 1 in which the image transmission path is a closed path and the step of projecting the parameter of the representation is performed continuously and the representation is transmitted around the closed path continuously whereby a combined optical display is produced comprising the real optical scene progressively and continuously modified by the parameter of the representation.

7. An apparatus for creating an optical display from a real optical scene which comprises:
   optical means for viewing a real optical scene and transmitting an image thereof;
   means for generating an electronic signal representing the image;
   processing means for creating a parameter of the image; and
   optical projection means for projecting said parameter of the image onto the real optical scene.

8. The apparatus of claim 7 in which said projection means comprises means for projecting the parameter of the image as a virtual image on the real optical scene.

9. The apparatus of claim 7 in which said projection means comprises means for projecting the parameter of the image as a real image on the real optical scene.

10. The apparatus of claim 7 in which said processing means comprises means for creating a parameter of the image which is a negative of the image.

11. The apparatus of claim 7 in which said processing means comprises means for creating a parameter of the image which is a defocused image of the image.

12. The apparatus of claim 7 in which said processing means comprises means for creating a parameter of the image which is a delayed image of the image.

13. The apparatus of claim 7 in which the processing means comprises means for creating a parameter of the image which is a delayed negative image of the image.

14. The apparatus of claim 7 further comprising continuous feedback means including continuous processing means and continuous optical projection means for continuously creating a parameter of the image and continuously combining the parameter of the image with the real optical scene, whereby said apparatus produces a combined optical display comprising the real optical scene progressively modified by the parameter of the image.

* * * * *